(No Model.) 6 Sheets—Sheet 1.
C. C. WARREN.
SYSTEM AND APPARATUS FOR GENERATING, ACCUMULATING, AND DISTRIBUTING POWER AND HEAT.
No. 546,796. Patented Sept. 24, 1895.
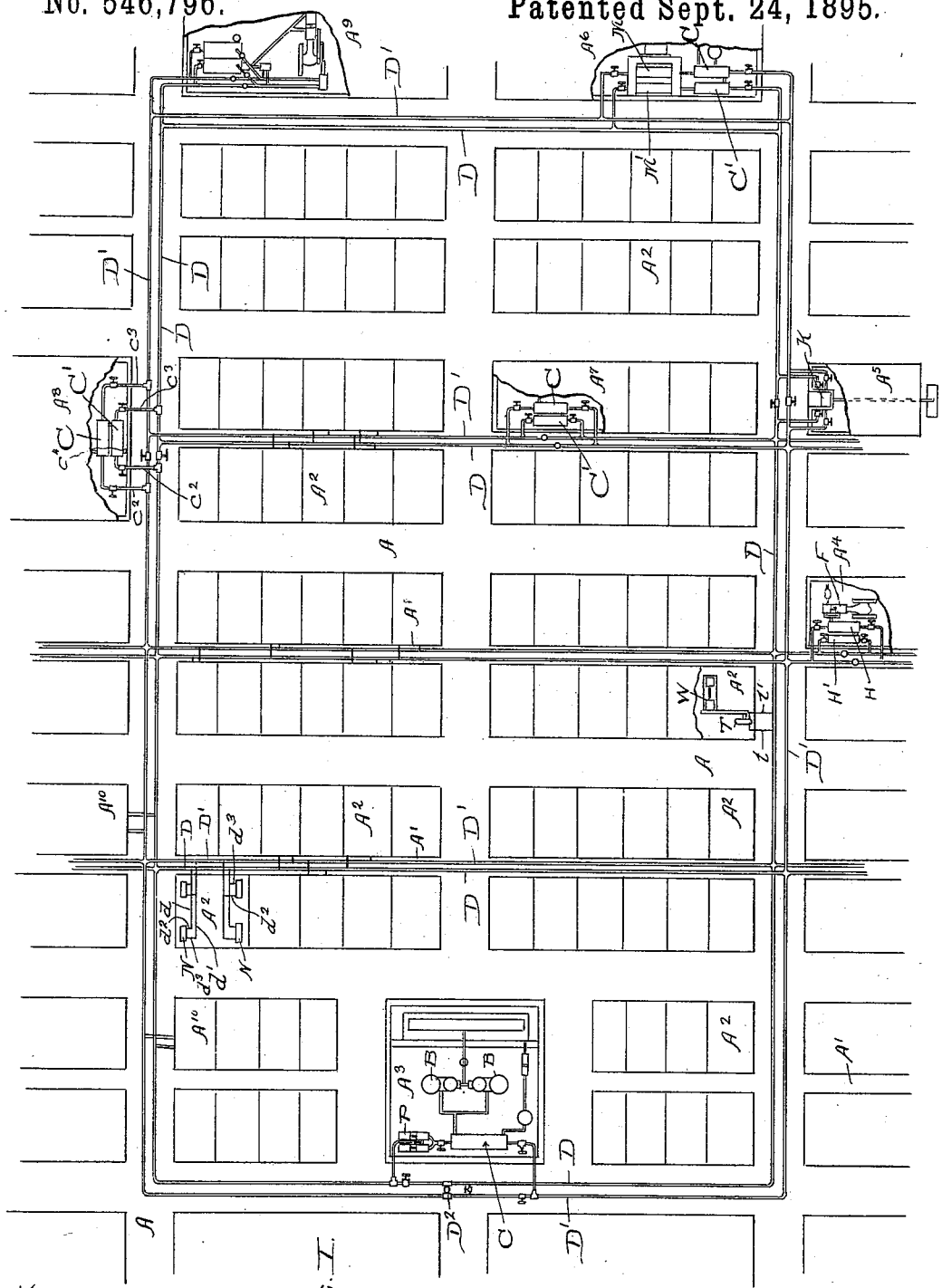
FIG. I.
WITNESSES:
Sew. C. Curtis
H. M. Munday,
INVENTOR:
Charles C. Warren
By Munday, Evarts & Adcock.
HIS ATTORNEYS (No Model.) 6 Sheets—Sheet 2.
C. C. WARREN.
SYSTEM AND APPARATUS FOR GENERATING, ACCUMULATING, AND DISTRIBUTING POWER AND HEAT.
No. 546,796. Patented Sept. 24, 1895.
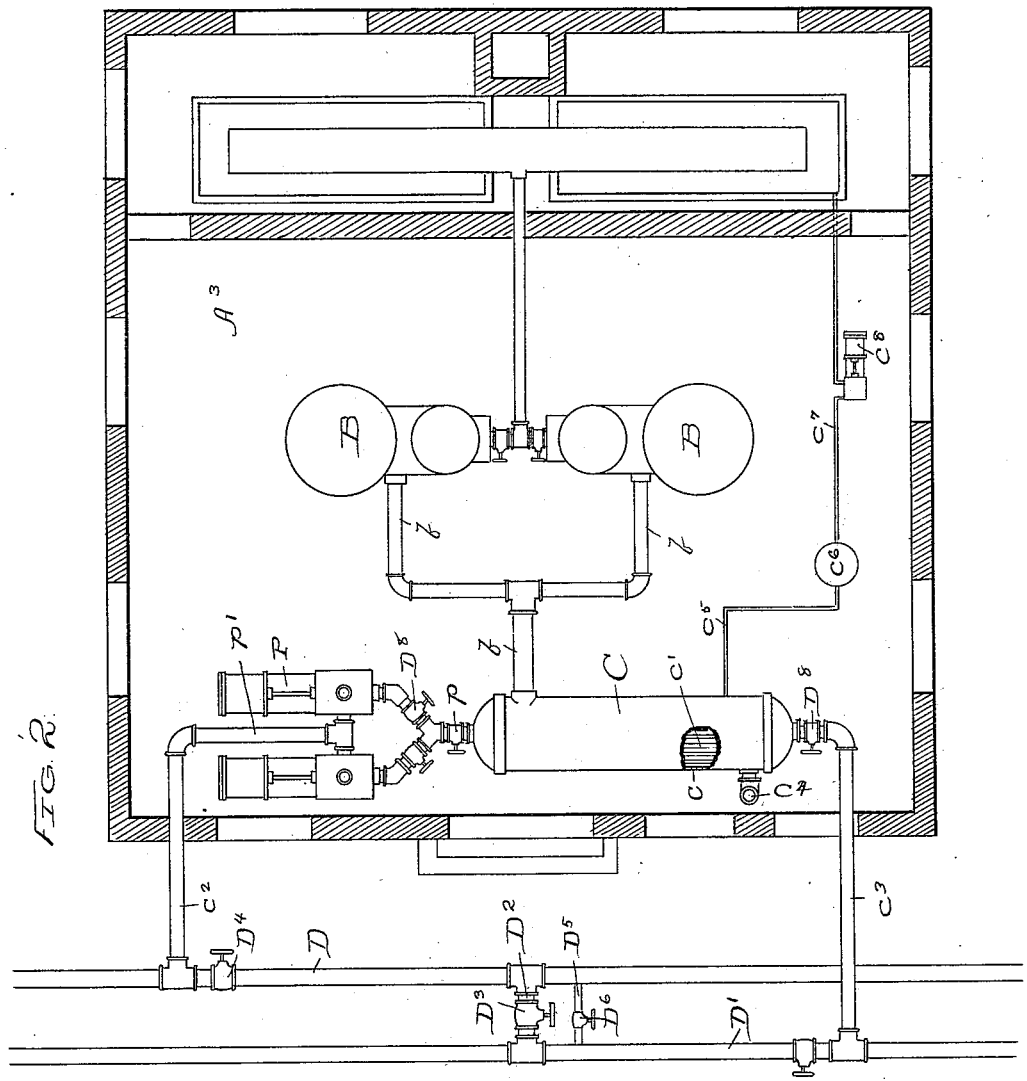
WITNESSES:
INVENTOR:
CHARLES C. WARREN
By Munday, Evarts & Adcock
HIS ATTORNEYS

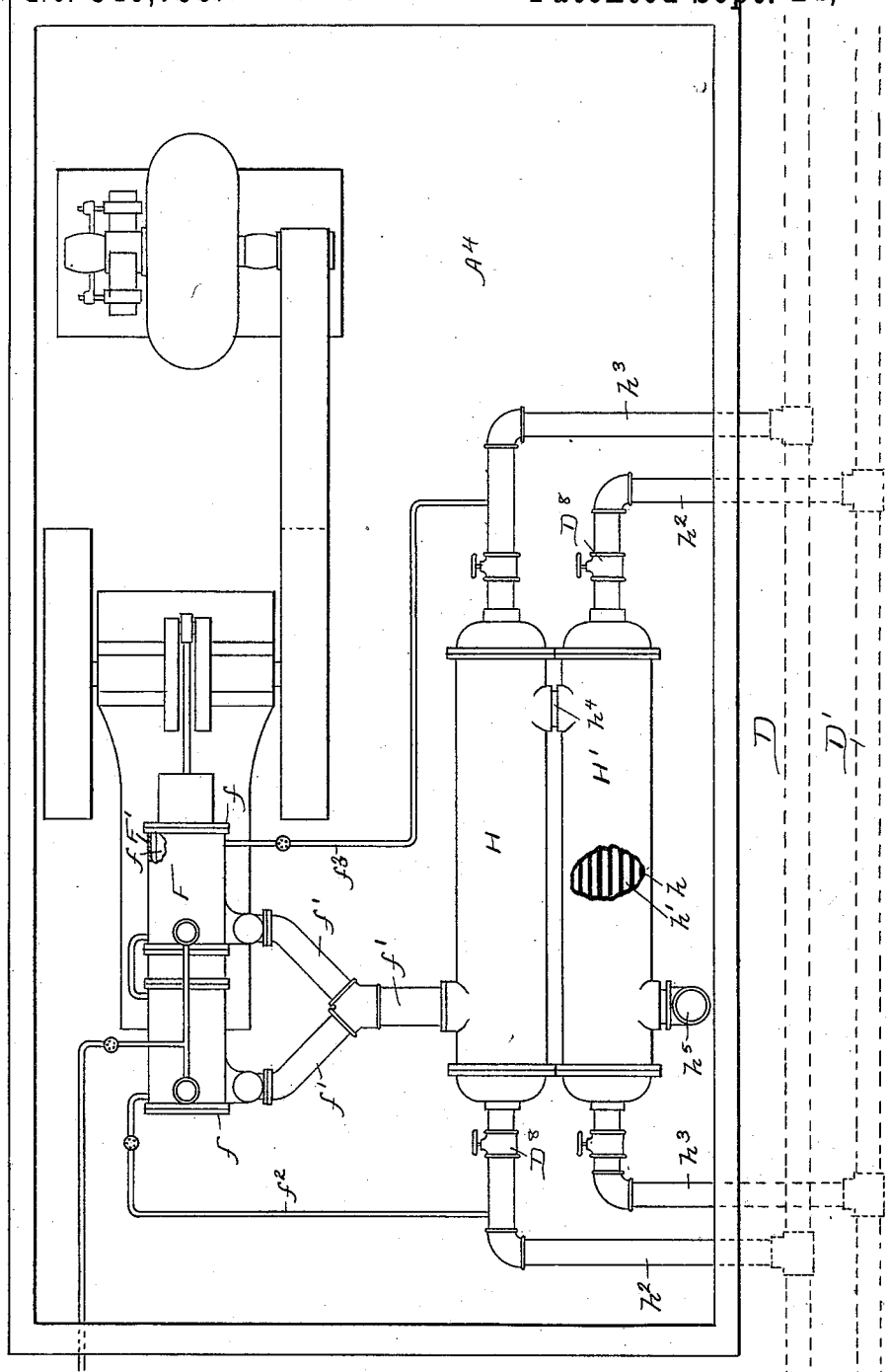

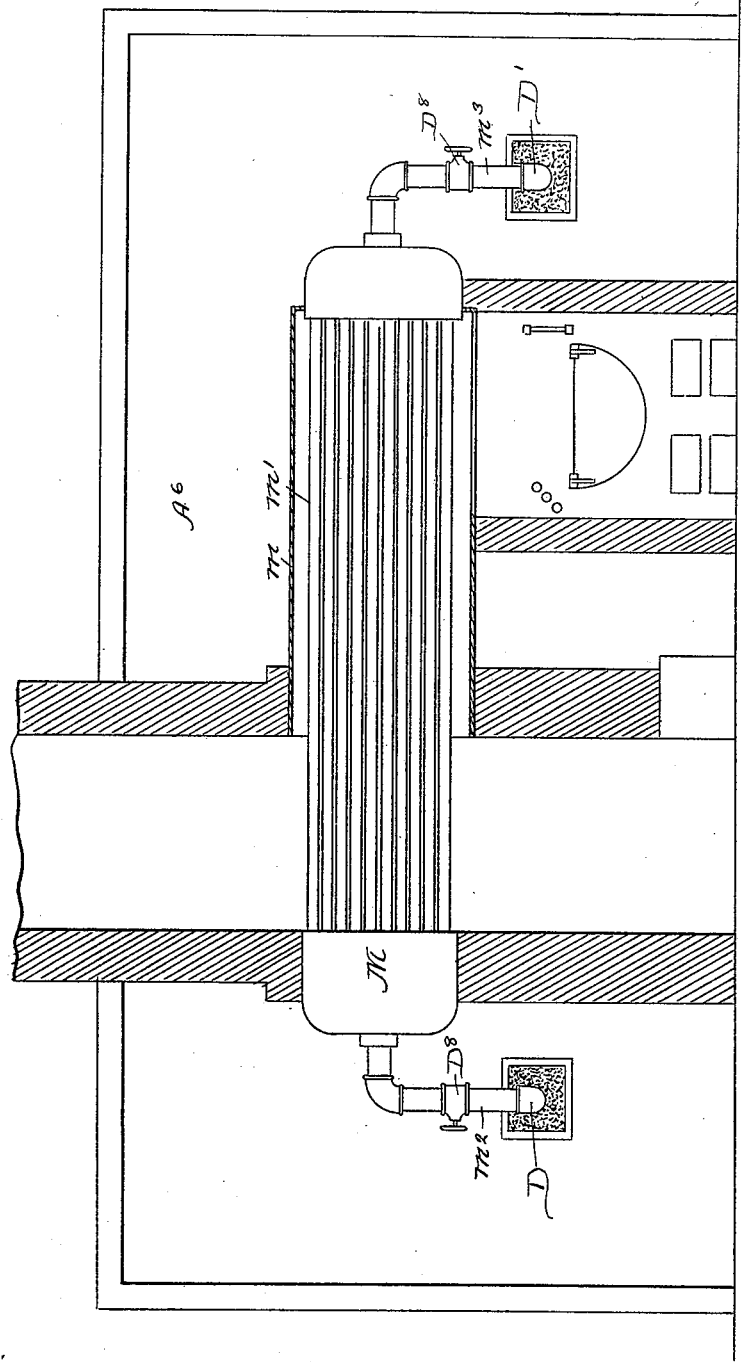

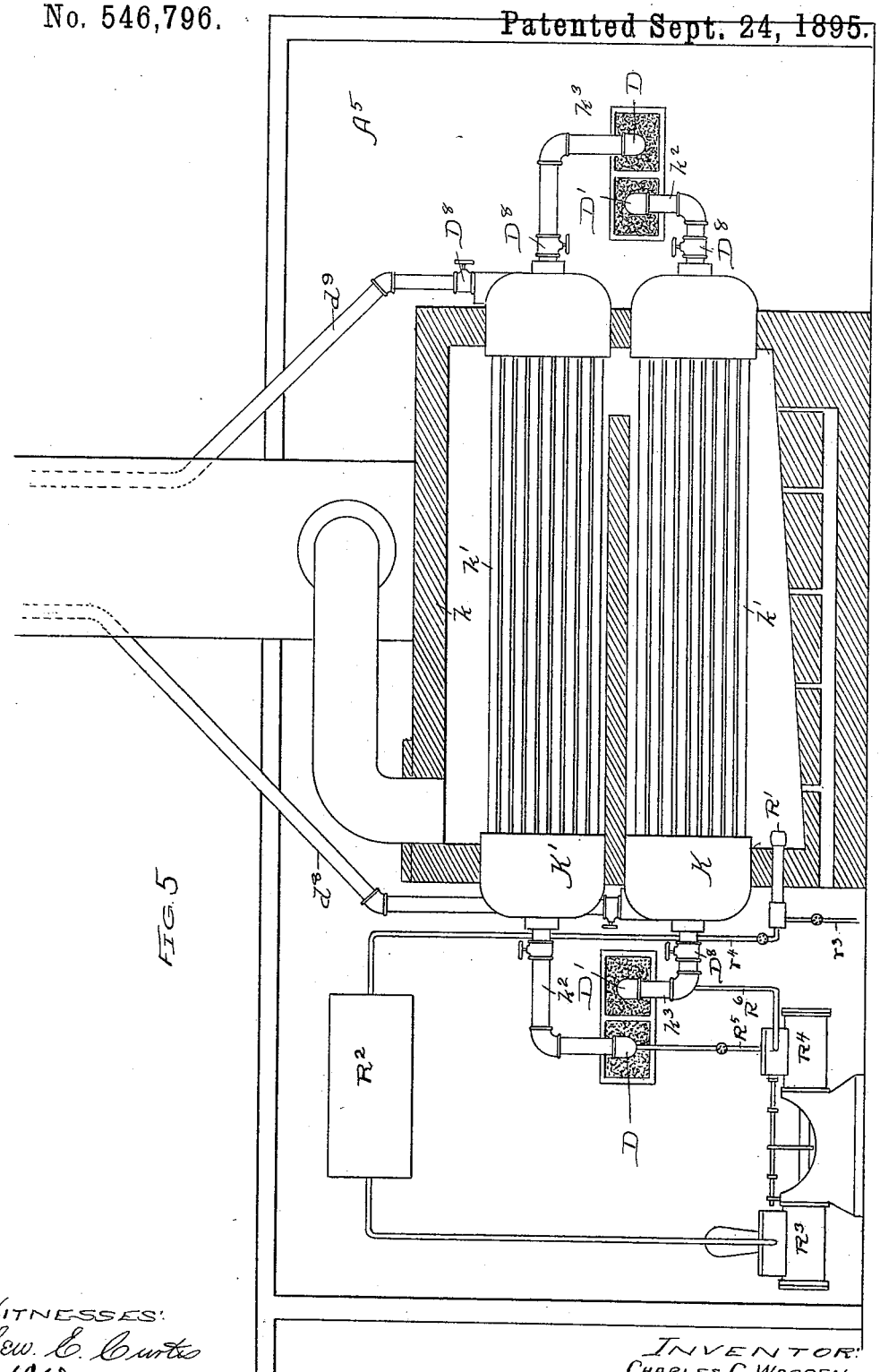

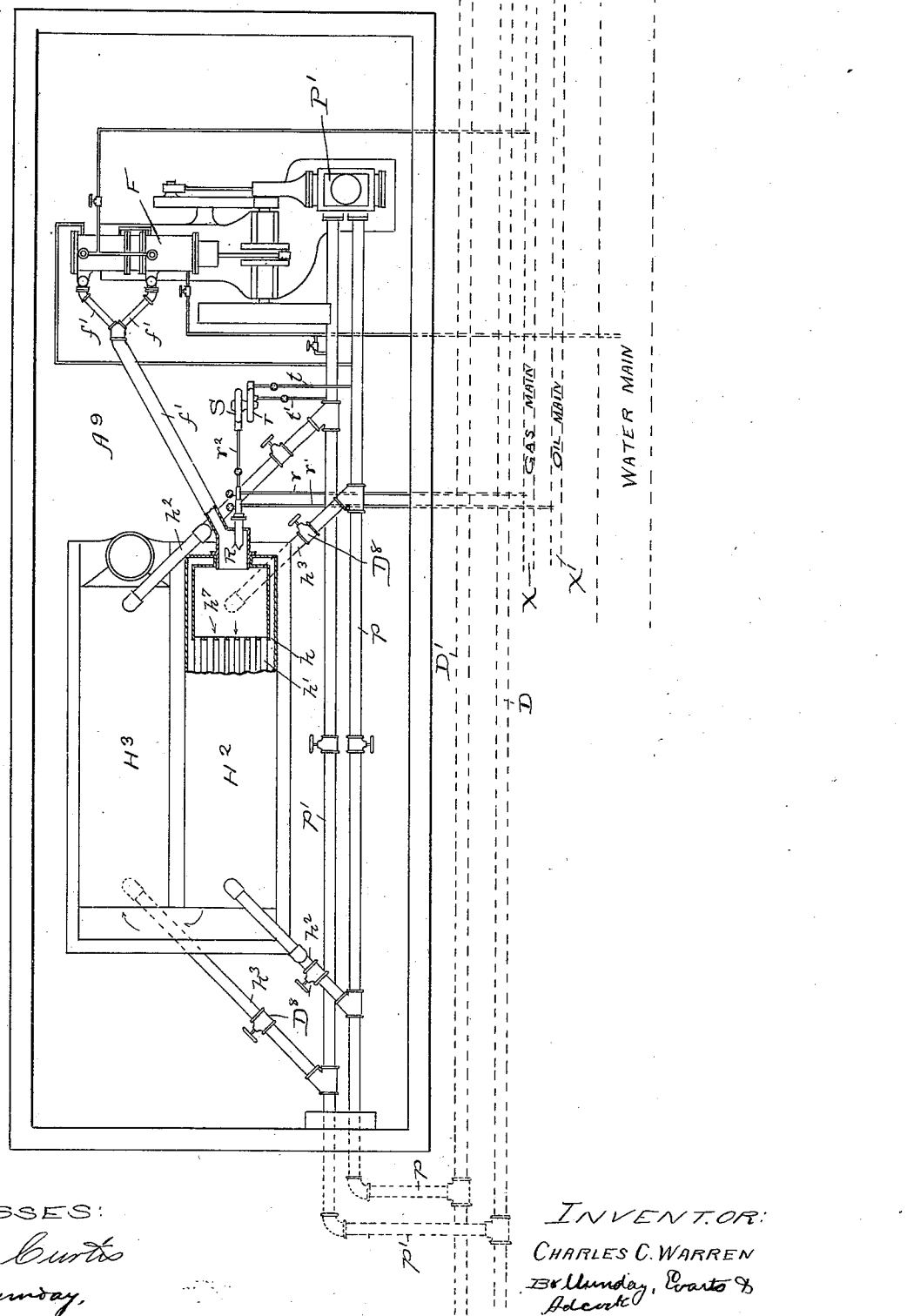

UNITED STATES PATENT OFFICE.

CHARLES C. WARREN, OF CHICAGO, ILLINOIS, ASSIGNOR OF ONE-HALF TO EMORY A. CLARK, OF SAME PLACE.

SYSTEM AND APPARATUS FOR GENERATING, ACCUMULATING, AND DISTRIBUTING POWER AND HEAT.

SPECIFICATION forming part of Letters Patent No. 546,796, dated September 24, 1895.

Application filed March 28, 1895. Serial No. 543,459. (No model.)

*To all whom it may concern:*

Be it known that I, CHARLES C. WARREN, a citizen of the United States, residing in Chicago, in the county of Cook and State of Illinois, have invented a new and useful Improvement in Systems and Apparatus for Generating, Accumulating, and Distributing Power and Heat, of which the following is a specification.

In cities and towns it is and has heretofore been customary at various distinct, separate, and diversely-located plants, factories, buildings, or places where power is required for use to burn large quantities of fuel in the form of coal, oil, or gas for the purpose of generating the necessary power required at each particular plant, factory, building, or place, a very large proportion of the total energy of the fuel being wasted at every such power-generating plant, whatever the kind of fuel employed or whatever the kind of engine or prime mover employed, the waste energy being largely in the form of escape-steam where steam-engines are employed, or in the form of escaping highly-heated products of combustion where gas or explosive engines are employed, and in order to warm or heat the various dwellings and other buildings large numbers of heating devices, requiring the direct consumption of large quantities of fuel, are located in the various buildings, making necessary a large amount of attendance and labor and causing much dirt and smoke. I am, however, aware that heretofore attempts have been made to utilize the waste heat of a single direct fuel-burning power-generating engine by conveying the exhaust-steam or water heated by it through suitable conductor-pipes to heat-radiators located in the factory or rooms of the building where the engine is placed; but this means has proved of but little practical utility for the reason that in most cases any one particular engine is generally run or used but a portion of the hours in a day, while the demand for heat at the radiators, especially if the same be used for warming living-rooms, generally continues throughout all the hours of the day, and because, also, in every such case a very great portion of the heat that might be saved or utilized is wasted, as the engine requires the same amount of fuel for power purposes on warm days as on cold days, while the amount of heat required at the radiators is very different; and I am also aware that heretofore it has been proposed to remedy to some extent the loss of fuel and waste of time and labor incident to the operation of a separate and distinct direct fuel-burning hot-water or other heater in each separate dwelling or building by employing one large central direct fuel-burning hot-water or steam heater and conducting and distributing the heat thus generated through hot-water or steam conductor pipes to a number of different dwellings or buildings; but while this means may be some improvement and result in some saving in fuel and labor over the means or method now commonly and generally in use it is open to the objection that the heating of all the different buildings or dwellings is directly dependent upon a single heater, which is liable to get out of order, and it is obvious that it affords no means of utilizing the waste heat of a large number of power-generating engines, such as are now commonly in use in all large cities.

The object of my invention is to provide a simple, efficient, and inexpensive system or means by which the waste heat or energy from a number of various separate sources may be utilized and each source made to supplement and co-operate with the others, variations in heat supplied from one source from time to time being compensated for by that supplied from other sources, and by which one common circulating system serves both as the means of collecting the heat from the several separated sources and of distributing it to the various dwellings or buildings where it is used.

My invention consists, in connection with a number or series of distinct and separated fuel-burning power-generating plants or engines, such as steam-engines or gas-engines, located as usual in different buildings, each furnished with a suitable device for heating water or other liquid by the waste or escape steam or heat and a series of heat radiators or transmitters located in different buildings, of a continuous set or system of pipes connecting together into a single unitary apparatus or system the heaters at all the various power-generating plants or stations of the system, and also communicating with the various heat-radiators, heat-transmitters, or devices for utilizing the heat. One or more pumps are employed to cause the water to be circulated throughout the entire system. By this means one common system of hot-water-conductor pipes serves not only to collect the waste heat from all the different sources, but also to distribute the heat to various points, where it is used, and the large volume of water in the system as a whole serves as a reservoir of heat to absorb and store up overproduction at one period for use at another period, and any inequality or variation in supply of heat from one or more of the sources is also compensated for by other sources connected in the same unitary system, and likewise variation in demand for heat at one part may be compensated for by reverse variations in demand at other parts of the system.

My invention also consists, in connection with said system or apparatus above mentioned, of one or more supplemental direct or fuel-burning heaters, as contradistinguished from the waste-heat-utilizing heaters, and which may be employed to a greater or less extent, as may be required, to compensate for any variations in the total supply of heat or in the total demand for heat, and which might not be compensated for by the apparatus itself without such supplemental heater.

In the accompanying drawings forming a part of this specification, Figure 1 is a plan or diagram view of an apparatus or system embodying my invention. Fig. 2 is an enlarged detail view showing a water-works pumping-station employing steam-engines which deliver their exhaust-steam into a hot-water heater. Fig. 3 shows a dynamo or electric-light plant or station employing gas-engines. Fig. 4 is a detail view showing a hot-water heater arranged to utilize the waste heat at the base of a chimney. Fig. 5 shows the supplemental heater; and Fig. 6 is a detail plan view of the supplemental pump or circulation reinforcing station, the pump being shown as driven by a gas-engine.

In the drawings, A A represent streets in a city or town; A', alleys, and $A^2$ various buildings—such as dwellings, factories, stores, office-buildings, &c.—which are to be warmed or heated; $A^3$, a water-works or pumping-station where steam-engines are employed; $A^4$, a dynamo or electric-light or power station where gas-engines are employed; $A^5$, a station where is located a supplemental direct or fuel-burning heater; $A^6$, a building or station where a heater for utilizing the waste heat at the base of a chimney is located.

$A^7$ represents an office-building; $A^8$, a cable-railway power-house, and $A^9$ a supplemental pump-station where power is generated and employed, and $A^{10}$ $A^{10}$ various other buildings or plants where power is generated and used by consumption of coal-gas or other fuel.

B B represent steam-engines at the various power houses or stations.

C C represent water-heaters, of any suitable kind or construction, located at each steam-power station and receiving the exhaust-steam from the engines through suitable steam-conductor pipes $b$ leading from the exhaust-ports of the engines to the heaters.

The exhaust-steam water-heaters C are of the ordinary construction, having passages for the steam and water, and preferably consist each of a shell or case $c$, containing a number of pipes or passages $c'$, the steam preferably passing through the surrounding shell or case and the water through the pipes or coils, although the same result would obviously be effected by a reverse arrangement.

The exhaust-steam water-heaters C at the various distinct and separate power-stations $A^3$ $A^4$ $A^8$ $A^9$ $A^{10}$, &c., of the system are all connected together into one unitary system by hot-water-conductor pipes D D', laid in the streets or alleys and constituting a continuous circuit or connected system of hot-water-circulating pipes.

Each of the heaters C is furnished with an outlet-pipe $c^2$ and an inlet-pipe $c^3$, communicating with the water-circulating pipes D D'. The outlet-pipe $c^2$ leads from the water-passage of the heater, preferably, to the pipe D, and the inlet $c^3$ leads to the heater from the pipe D', which may be termed the "return-pipe," and also in some cases from the pipe D, as illustrated in the drawings. The exhaust-steam, after passing through the heater C, may escape, or the portion not condensed may escape, through the escape-pipe $c^4$. In some cases, however, I find it advantageous to employ secondary or additional heaters C', preferably of the same construction as the heaters C, and which receive the exhaust-steam from the heater C and discharge it into the exhaust or escape pipe $c^4$. These secondary or supplemental heaters have outlet and inlet pipes $c^2$ $c^3$, the same as the heaters C, and these inlet and outlet pipes $c^2$ $c^3$ may connect directly with the pipe D or the pipe D', or one with one and the other with the other, but preferably both with the return-pipe D', as shown in the drawings.

At each gas-engine F, operating to generate power by the explosive combustion of gas, gasoline, or other explosive fluid or compound, I provide a water-heater H, of any known or suitable construction, which is adapted to receive the escape heat or heated products of combustion escaping from the cylinder or cylinders $f$ of the gas-engine and utilize the same for heating water. Such heaters have a passage or passages $h$ for the heat or products of combustion and a passage or passages $h'$ for the water to be heated, the former consisting, preferably, of an inclosing shell or case and the latter of a number of pipes, as illustrated in the drawings. The water-passage $h'$ of the heater is connected with the common system of hot-water-circulating pipes D D' by an outlet-pipe $h^2$ and inlet-pipe $h^3$. The inlet and outlet pipes $h^3$ $h^2$ may connect with either one or both of the pipes D D'; but preferably I connect both the inlet-pipe $h^3$ and the outlet-pipe $h^2$ to the pipe D, which ordinarily contains the hotter water. To further utilize the escape heat I provide an additional or secondary heater H′, preferably of the same construction as the heater H, and which receives the exhaust from the heater H through a connecting-pipe $h^4$ and discharges the same into the escape pipe or flue $h^5$. The cylinder or cylinders of the gas-engine are connected by a pipe or pipes $f'$ with the heater-shell $h$.

K represents a supplemental hot-water heater operating by the direct consumption of fuel—such as coal, oil, or gas—preferably oil or gas. This direct fuel-burning supplemental heater may be of any known or ordinary or suitable construction, but preferably comprises an inclosing shell or furnace $k$ for the heat or products of combustion and a number of pipes or passages $k'$ for the water. The water passage or chamber $k'$ of this supplemental direct fuel-burning heater communicates with the hot-water conductors D D′ by means of an outlet-pipe $k^2$ and an inlet-pipe $k^3$. This supplemental direct fuel-burning heater is also preferably provided with an additional heater K′, of similar construction, having its water-passages $k'$ connected by outlet and inlet pipes $k^2$ $k^3$ with the return-water-conductor pipe D′, though both heaters K K′ may, if preferred, be connected with either one or both of the conductors D D′.

The water-jacket F′ of the gas-engine is connected by pipes $f^2$ $f^3$ with the conductors D D′, one or both the pipes $f^2$ $f^3$ leading either directly or indirectly to the conductors. If preferred, the inlet-pipe $f^3$, leading to the water-jacket of the gas-engine, may be connected with a hydrant or outside source of water-supply under greater pressure than the water in the conductors D D′, so that cold water will be delivered to the water-jacket, and thus also supply the waste or loss of water that may occur in the system. This arrangement is indicated by the dotted lines in Fig. 6.

M and M′ are water-heaters located in the base or breeching of a chimney for utilizing in part the waste heat thereof. These heaters are of substantially the same construction as those before described and comprise a shell, passage, or chamber $m$ for the heat or products of combustion and one or more pipes or passages $m'$ for the water to be heated, connected by outlet-pipes $m^2$ and inlet-pipes $m^3$ with the conductors D D′, one or both. The base or breeching of the chimney itself serves as the shell or passage $m$ for the heat or products of combustion.

N N represent various hot-water heat radiators, transmitters, or devices for utilizing the heat of the hot water in the various buildings $A^2$. These heat radiators or transmitters are all connected with the hot-water conductors D D′ by suitable branch and sub-branch pipes $d$ $d'$ $d^2$ $d^3$, &c., all the connections being made in multiple or parallel.

P is the pump, located at one of the power-stations, and by which the mass of water in the entire connected system of pipes, heaters, and radiators is kept in circulation. The feed or inlet end of the pump is connected by a pipe $p$ with the return-conductor D′ and the discharge or outlet by a pipe $p'$ with the conductor D.

P′ represents a supplemental or reinforcing pump located at the station $A^9$ for the purpose of reinforcing and maintaining the pressure in the conductors D D′. The feed or inlet end of this supplemental pump is connected by a pipe $p$ with the return-conductor D′, and its discharge or outlet end is connected by the pipe $p'$ with the conductor D. This supplemental or reinforcing pump may be driven by any suitable engine. It is represented in the drawings as being driven by a gas-engine F, similar to the gas-engine F before described, and having heaters $H^2$ $H^3$ connected therewith and similar to the heaters H H′ before described. The heater $H^2$ has its shell or heat-passage $h$ connected with the gas-engine cylinders by a pipe or pipes $f'$. The water passage or passages $h'$ of the heaters $H^2$ $H^3$ are connected by inlet-pipes $h^3$ and outlet-pipes $h^2$ with the pipes $p$ $p'$, connecting the supplemental pump P′ with the conductors D D′. The heater $H^2$ has its shell or heat-passage $h'$ furnished with a combustion-chamber $h^7$, which I provide with a fluid-injector nozzle or burner R, so that this heater $H^2$ may be used as a supplemental direct fuel-burning or reinforcing heater, if or when desired. The nozzle or burner R is connected by a pipe $r$ with a gas-main X, and it may also be connected by a pipe $r'$ with an oil main or supply X′. The burner R communicates with an air-injector pipe $r$, supplied with a blast of air by a fan S, driven by a water-motor T, which is connected by the pipes $t$ $t'$ with the conductors D D′ or with the pipes $p$ $p'$, connected to said conductors, so that the difference in pressure between the outgoing pipe D and the return-pipe D′ may be utilized for driving the water-motor.

Water-motors T, connected by pipes $t$ $t'$ with the conductors D D′ and driven by the difference of potential or pressure in the pipes D D′, may be located in the various buildings $A^2$ and used for supplying power to machines of various kinds, especially such as require light power. The system thus serves as a means of supplying and distributing power as well as heat. To increase the amount of power thus supplied a number of supplemental or pressure reinforcing pumps P′ may be employed at various points of the system where required.

$D^2$ is a short connecting-pipe extending between the conductors D D′, preferably located near the pump P, so that by momentarily opening the valve $D^3$, with which it is provided, and closing the valve $D^4$ in the pipe D the force of the pump may be thrown directly upon the water in the return-pipe D′ for the purpose of starting the circulation therein if at any time it should become sluggish. A small by-pass pipe D⁵, connecting the pipes D D', is preferably left open all the time, although it may be closed by its valve D⁶. The water-circulating pipes D D' and the branches leading therefrom to the various heaters and heat radiators or transmitters are all supplied with suitable valves D⁸ for regulating the flow of the water and to enable any particular heater or other device to be disconnected from the system when required.

The shell, furnace, or combustion-chamber $k$ of the supplemental direct fuel-burning heater K is preferably supplied with a fluid-fuel injector nozzle or burner R', connected by pipe $r^3$ with a gas or oil main, and having an air-blast or injector pipe $r^4$, which is supplied with air under pressure from an air-reservoir $R^2$, connected with an air-pump $R^3$, actuated by a water-pressure engine $R^4$, the cylinder of which is connected by pipes $R^5 R^6$ with the conductors D D', so that the difference of pressure between the conductors D D' will actuate the piston of the water-engine, and thus the piston of the water-pump. The branch pipes $d^8 d^9$ (shown in Fig. 5) are air-trap pipes to permit the air that may accumulate in the inclosed system to escape.

Live steam as well as exhaust-steam may from time to time be delivered into any one or more of the heaters C, and such heaters thus made to serve as supplemental or reinforcement heaters for the system as well as the heater K, if desired or required.

The exhaust-steam water-heaters C are furnished with traps or drain-pipes $c^5$, leading to wells or reservoirs $c^6$ to draw off the water of condensation. This distilled water should be returned to the engine-boilers to feed or supply the same with pure water. In the drawings, $c^7$ indicates the pipe leading to the feed-pump $c^8$ of the boiler.

I claim—

1. The combination with a circuit of pipes including the usual radiators of a liquid heat vehicle within, and means for propelling said heat vehicle through the said circuit of pipes, and a plurality of sources of intermittent or variable waste heat supply situated at different points of and adapted to heat said circuit, whereby some of the said sources of heat will supplement the action of or compensate for the inaction of other of said sources of heat, substantially as specified.

2. The combination with a circuit of pipes including the usual radiators of a liquid heat vehicle within, and means for propelling said heat vehicle through the said circuit of pipes, and a plurality of sources of intermittent or variable waste heat supply situated at different points of and adapted to heat said circuit, whereby some of the said sources of heat will supplement the action of or compensate for the inaction of other of said sources of heat, together with a supplemental or reinforcing direct fuel burning heater for heating directly the liquid in the circuit to be used when the waste heat is not sufficient, substantially as specified.

CHARLES C. WARREN.

Witnesses:
H. M. MUNDAY,
LEW. E. CURTIS.